United States Patent
Stanhope

(10) Patent No.: US 7,854,098 B2
(45) Date of Patent: Dec. 21, 2010

(54) SOFTWOOD-CEILING / HARDWOOD-FLOOR STRUCTURE COMPRISED OF A SINGLE SET OF BONDED BOARDS

(76) Inventor: Thomas Spencer Stanhope, 637 Maquam Shore Rd., Swanton, VT (US) 05488

( * ) Notice: Subject to any disclaimer, the term of this patent is extended or adjusted under 35 U.S.C. 154(b) by 143 days.

(21) Appl. No.: 11/890,890

(22) Filed: Aug. 8, 2007

(65) Prior Publication Data

US 2009/0042010 A1    Feb. 12, 2009

(51) Int. Cl.
*E04C 1/00*    (2006.01)
(52) U.S. Cl. .................. 52/309.3; 52/177; 52/309.1
(58) Field of Classification Search .............. 52/177, 52/309.3, 309.1
See application file for complete search history.

(56) References Cited

U.S. PATENT DOCUMENTS

| | | | |
|---|---|---|---|
| 3,401,495 A * | 9/1968 | Schneller | 52/483.1 |
| 3,701,743 A | 10/1972 | Horowitz et al. | |
| 5,040,582 A | 8/1991 | Hsu | |
| 5,058,343 A * | 10/1991 | Nipko | 52/233 |
| 5,253,464 A | 10/1993 | Nilsen | |
| 6,023,900 A * | 2/2000 | Stoehr et al. | 52/403.1 |
| 6,182,413 B1 | 2/2001 | Magnusson | |
| 7,603,824 B1 * | 10/2009 | Hartanto | 52/384 |
| 2003/0150189 A1 * | 8/2003 | Ou et al. | 52/784.1 |
| 2005/0076598 A1 * | 4/2005 | Lewark | 52/591.4 |
| 2008/0028699 A1 * | 2/2008 | Mak | 52/179 |

FOREIGN PATENT DOCUMENTS

ZA    8304207 A    6/1983

* cited by examiner

*Primary Examiner*—Richard E Chilcot, Jr.
*Assistant Examiner*—Mark R Wendell
(74) *Attorney, Agent, or Firm*—Thomas G. Ference

(57) ABSTRACT

A structure comprising a softwood-ceiling/hardwood-floor formed of a single set of adjacent boards. Each of the boards including a hardwood layer bonded to a softwood layer, the board having a first edge and a second edge, the first edge having a tongue, the second edge having a groove, the first edge having a first chamfer on the softwood layer, the second edge having a second chamfer on the softwood layer. All boards securely attached to carrying beams that span the walls between two levels within a building.

29 Claims, 3 Drawing Sheets

SOFTWOOD-CEILING / HARDWOOD-FLOOR STRUCTURE COMPRISED OF A SINGLE SET OF BONDED BOARDS

FIELD OF THE INVENTION

This invention relates generally to the installation of flooring and ceiling. In particular, the present invention is directed to a single set of bonded hardwood/softwood boards that creates a hardwood floor and softwood ceiling using only one layer of boards.

BACKGROUND OF THE INVENTION

The log cabin and post and beam building industry traditionally matches the ceiling materials to that of the softwood walls of the room. Tongue and groove softwood boards are laid across the post and beam structure. The softwood-ceiling boards typically have a chamfer on each edge to help aesthetically offset any minor variations where the boards meet. If the boards are for a first level ceiling, they may also act as the flooring for the second level of rooms if they have sufficient thickness. However, many homeowners would prefer a hardwood floor as it is more durable than softwood and the hardwood can add an aesthetically appealing visual offset to all of the surrounding softwood making up the walls and ceiling. Currently to install a hardwood floor in a post and beam building requires that the builder lay down a second layer of flooring made of hardwood on top of the softwood flooring already in place for the lower level ceiling. Laying down a second layer of flooring made of hardwood adds considerably to materials cost and labor. These costs may be more than fifty percent of the overall flooring/ceiling costs. The prior art offers no alternatives to the two step process of laying down hardwood flooring on top of a softwood floor/ceiling to create a hardwood floor and softwood ceiling between two levels of a building.

SUMMARY OF THE INVENTION

One aspect of the present invention is directed to a board comprising a hardwood layer bonded to a softwood layer, the board having a first edge and a second edge, the first edge having a tongue and the second edge having a groove, the first edge having a first chamfer on the softwood layer and the second edge having a second chamfer on the softwood layer.

Another aspect is directed to a method of fabricating a board comprising, providing a saw cut hardwood layer and a saw cut softwood layer. Bonding the hardwood layer to the softwood layer with an adhesive to create a two species bonded board. Milling the two species bonded board to have (i) a tongue on a first edge and a groove on a second edge and (ii) a chamfer on the first and second edges of the softwood layer.

Still another aspect is directed to a structure comprising a ceiling/floor formed of a single set of adjacent boards, each of the adjacent boards including a two species bonded board having a softwood side and an hardwood side.

Yet another aspect is directed to a method of fabricating a ceiling/floor comprising, providing carrying beams and a set of ceiling/floor boards, each ceiling/floor board including a two species bonded board having a softwood side and a hardwood side, laying the set of ceiling/floor boards adjacent to each other with the softwood side towards the carrying beams and securing each ceiling/floor board to the carrying beams as each ceiling/floor board is laid.

BRIEF DESCRIPTION OF DRAWINGS

The foregoing and other aspects and advantages of the invention will be apparent from the following detailed description of the invention, as illustrated in the accompanying drawings, in which:

FIG. 3b is a bottom perspective view of the softwood-ceiling/hardwood-floor structure in FIG. 3a.

DETAILED DESCRIPTION OF THE INVENTION

Figure 1:
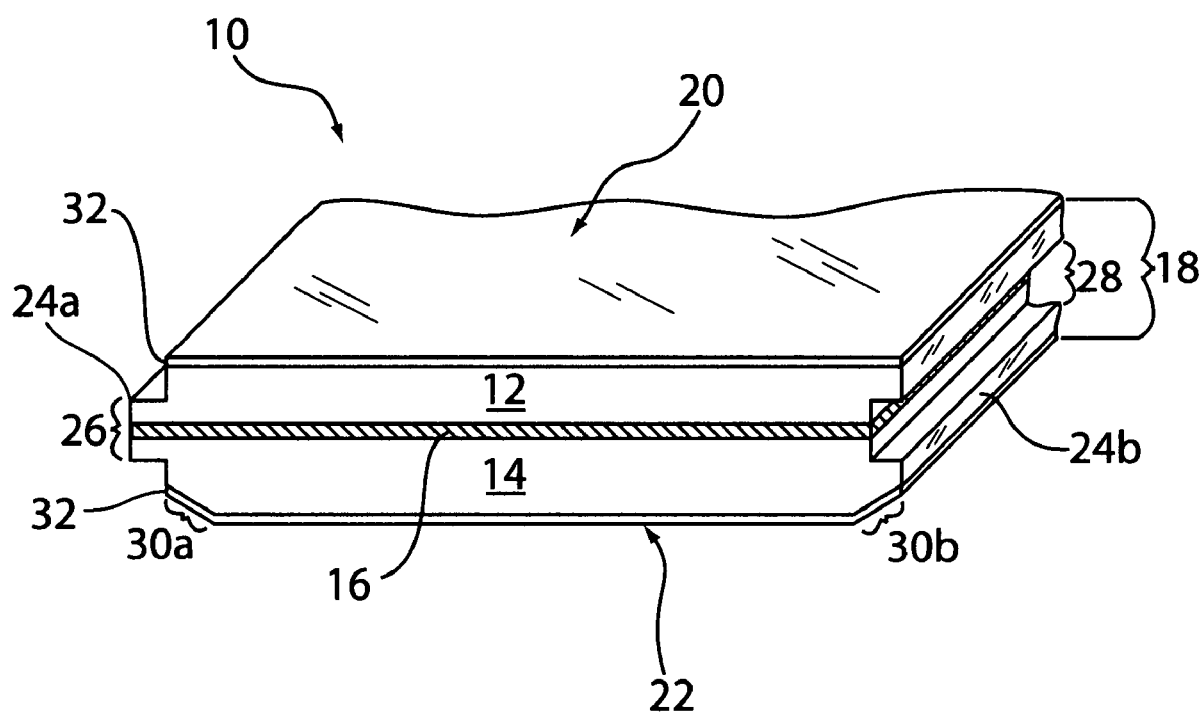
FIG. 1 is a sectional view of a board according the present invention wherein a hardwood layer is bonded to a softwood layer and shaped for use as a unitary ceiling/floor board.

FIG. 1 illustrates board 10 according to the present invention. Board 10 can be in the range of 2-12 inches wide and 2-20 feet long, but is typically about 6-inches wide and 8-feet long. Board 10 comprises a single first layer 12 bonded to single second layer 14. First layer 12 and second layer 14 can each be a single piece of lumber or a single piece of graded, finger-jointed lumber. First layer 12 is one species of wood and second layer 14 is a different species of wood, however, the first layer is preferably hardwood and the second layer is preferably softwood. Hardwoods include species such as oak, maple, birch, ash, walnut, hickory, cherry, and any other domestic or imported hardwood. Softwoods include species such as pine, spruce, fir, white cedar, red cedar and any other domestic or imported softwood. First layer 12 and second layer 14 are both saw cut layers rather than rotary peeled from the circumference of the log, which is known as veneer fashion. Rotary peeled layers inherently have fractures from the peeling process making them undesirable for use in boards 10.

Board 10 is fabricated by first sawing logs into rough cut boards to be used as layers. The layers are kiln dried to 6-8% moisture. Having low moisture content helps reduce warping in board 10. First layer 12 is bonded to second layer 14 with adhesive layer 16. Adhesive layer 16 is applied to one or both of the plane surfaces of the two wood layers to be joined. Adhesive layer 16 may be rolled or sprayed onto each wood layer. First layer 12 and second layer 14, with adhesive layer 16 between them, is then press rolled or clamp pressed to create a two species bonded board 18. Heating by radiation or RF heating may or may not be incorporated into the process depending on the type of adhesive used. Adhesive layer 16 may be a glue, an epoxy or other similar wood-bonding agent. Examples of commercially available wood bonding adhesives are TITEBOND® 50 and TITEBOND® Regular, both aliphatic resin emulsion adhesives manufactured by Franklin Adhesives.

Two species bonded board 18, having hardwood side 20 and softwood side 22, is then milled to provide board 10 with first edge 24a and second edge 24b. During the milling process a tongue 26 is created in first edge 24a and a groove 28 is created in second edge 24b. The tongue 26 of a first board is shaped to fit in groove 28 of a second board so that when boards 10 are laid adjacent to each other the tongue in groove structure provides a tight interlocking seam between the boards. Board 10 may also have a tongue on one end and a groove on the other opposing end for creating a tongue in groove interlocking seam when the boards are laid end-toend. On softwood side 22, first edge 24a is further provided with first chamfer 30a and second edge 24b is further provided with second chamfer 30b. Chamfers 30a and 30b are typically ⅛-inch to ½-inch and help aesthetically offset any minor variations where boards 10 meet when the boards are laid adjacent to each other. A micro-bevel of less than 1/16-inch may also be provided on first edge 24a and second edge 24b of the hardwood side 20. Once milled to spec board 10 may have hardwood side 20 or softwood side 22 sanded. A finishing layer 32 may be applied to either or both hardwood side 20 and softwood side 22. Finishing layer 32 protects the luster and beauty of the wood. Finishing layer 32 may include at least one from the group including a stain, polyurethane, varnish or a mixture thereof.

Figure 2:
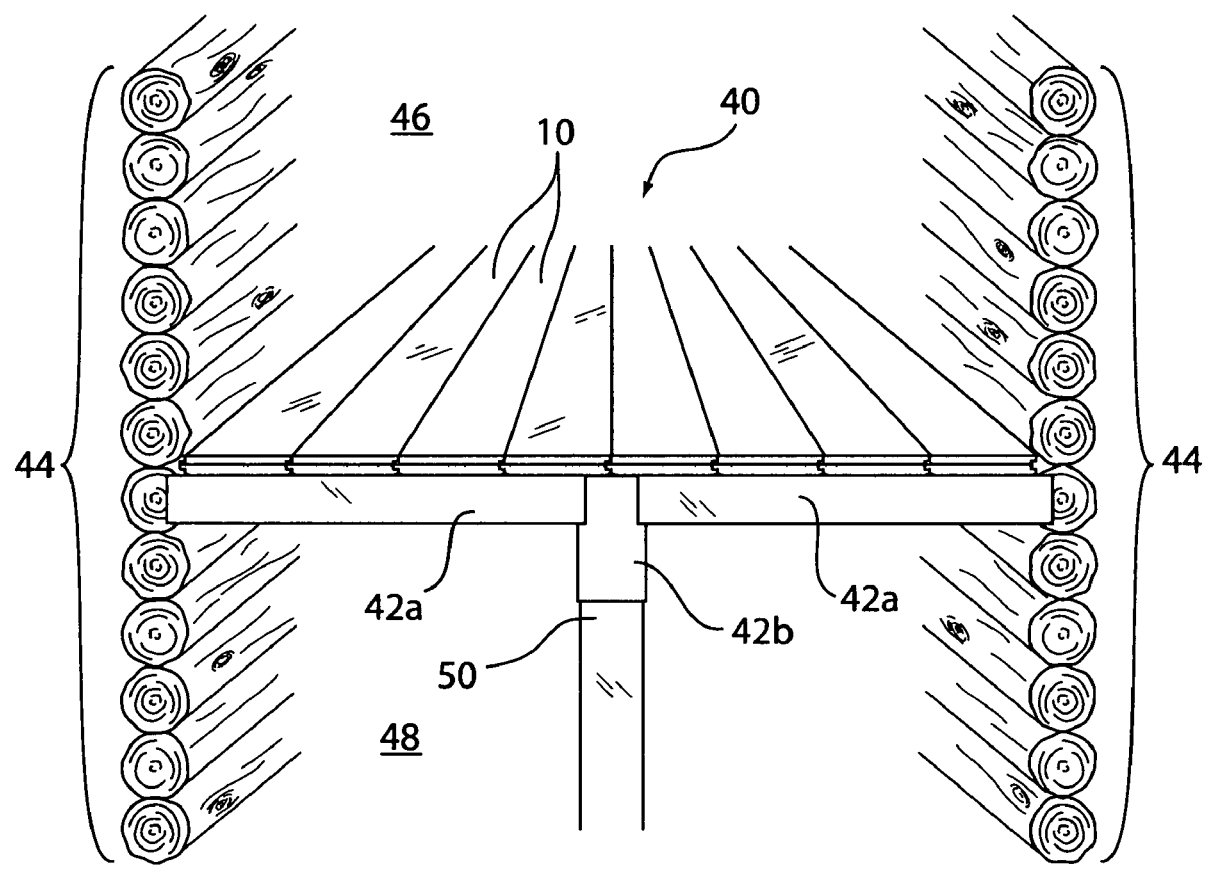
FIG. 2 is a side, sectional perspective view of a softwood-ceiling/hardwood-floor structure between a first and second level in a log or post and beam building.
Figure 3A:
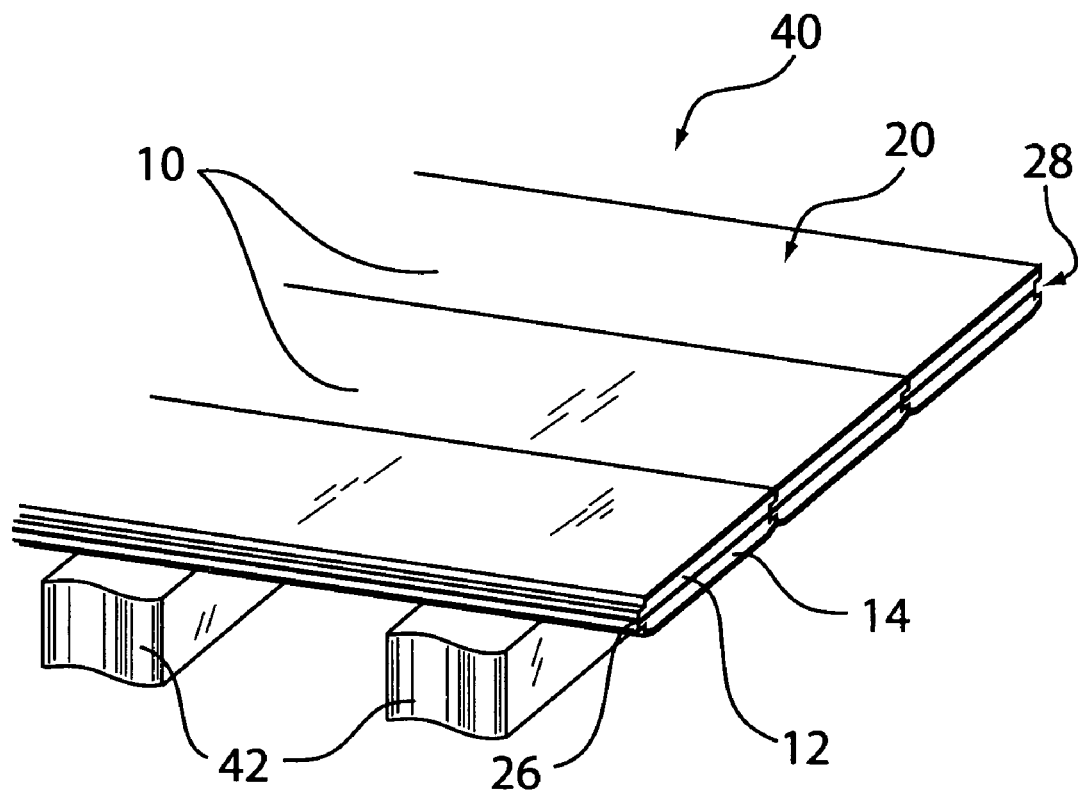
FIG. 3a is a top perspective view of a softwood-ceiling/hardwood-floor structure comprised of a single set of the ceiling/floor boards depicted in FIG. 1.
Figure 3B:
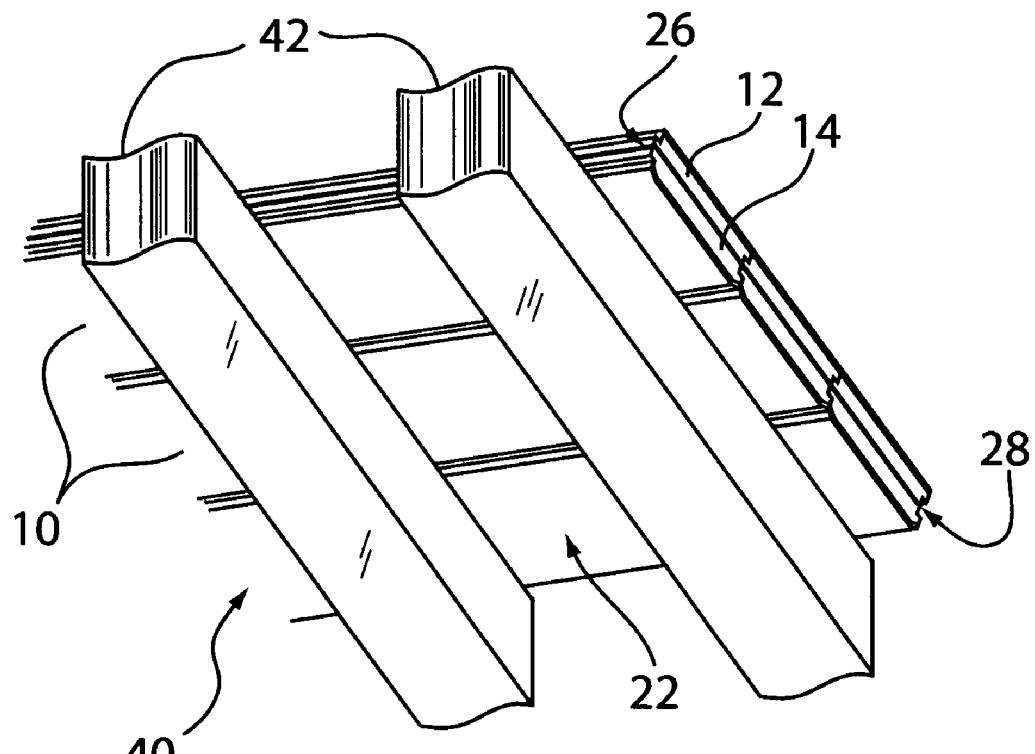

Softwood-ceiling/hardwood-floor structure 40, illustrated in FIGS. 2, 3a and 3b, are formed from a single set of adjacent boards 10. When fabricating structure 40, carrying beams 42 are first provided to span walls 44 between first level 46 and second level 48 within a building. First level 44 and second level 46 may be the basement and ground level, ground level and second story, second story and third story, etc. Carrying beams 42 are usually softwood and match the wood used to construct the exterior walls of the home. Carrying beams 42 include floor joists 42a. If engineering calls for it, carrying beams 42 may also include a main carrying beam 42b. Floor joists 42a generally lay at right angles to main carrying beam 42b. Main carrying beam 42b requires the support of post 50.

To construct the softwood-ceiling/hardwood-floor structure 40, the user usually starts on one side of the room. A first board 10 is placed with softwood side facing downwards, toward carrying beams 42 and secured to the carrying beams. Each board 10 is usually secured by hammering nails through tongue 26. The next board 10 is then laid adjacent to the first board with groove 28 of the second board fitted into tongue 26 of the first board. This second board 10 is then secured to carrying beams 42. The process of laying and securing boards 10 adjacent to each other is carried out until the whole ceiling/floor structure 40 is complete. Using this process a hardwood-floor and softwood-ceiling structure 40 can be fabricated using only a single layer of boards 10 in one pass. This provides a significant time/cost savings over the two step process of laying a softwood ceiling and then subsequently laying a hardwood floor.

Flooring/ceiling structure 40 and boards 10 are unique from the prior art in several respects. First, boards 10 are not constructed from thin laminate sheets. A laminate is usually a layer less than 1/16-inch thick. Second, boards 10 are not a veneer. Veneer consists of a thin layer of one type of wood bonded on top of a thick base board of a different type of wood, where the veneer is merely for changing the appearance of one side of the board and has no other function. Veneer is usually a layer rotary peeled from a log and less than ⅛-inch thick. In the current invention both first layer 12 and second layer 14 are saw cut and greater than ¼-inch thick, preferably greater than ½-inch thick. First layer 12 has a first thickness and second layer 14 has a second thickness wherein the first thickness is about equal to the second thickness. The minimum thickness ratio of first layer 12 to second layer 14 is twenty-five percent hardwood to seventy-five percent softwood or 1:3. The maximum thickness ratio of first layer 12 to second layer 14 is fifty percent hardwood to fifty percent softwood or 1:1. Since boards 10 will act as the floor of the second level, they require sufficient structural thickness to support what is placed on the floor. Boards 10 will typically range in thickness from 1-inch to 4-inches thick.

An additional requirement that second layer 14 not be a laminate or veneer is that in order for second layer 14 of board 10 to have a chamfer 30 on each edge 24 and not show a bonding seam, the thickness of second layer 14 must be greater in thickness than the height of the chamfer. A chamfer of ⅛-inch or more requires that second layer 14 be thicker than ⅛-inch. If second layer 14 was just a laminate or veneer, it would show a bonding seam in chamfer 30. Hence second layer 14 cannot be a laminate or veneer. First layer 12, which is the flooring layer, is typically sanded and refinished many times during the life of the flooring. This requires that first layer 12 also not be a laminate or veneer. If layer 12 was a laminate or veneer it would be sanded away after being refinished only once or twice. Therefore, neither first layer 12 nor second layer 14 can be a laminate or veneer.

Tongue 26 and groove 28 must be at the same height on each edge 24 on board 10 so that they line up when the boards are placed adjacent and edge-to-edge with each other. Tongue 26 and groove 28 may span a considerable thickness of board 10 so as to include part of first layer 12 and second layer 14. Because first layer 12 and second layer 14 are thick layers, tongue 26 and groove 28 may lie within just one of either layer. The board may also have two tongues 26 and two grooves 28 each lying respectively in first layer 12 and second layer 14.

The invention is not limited to the embodiments represented and described above but includes all variants notably those concerning the species of hardwood and softwood used, the exact ratio of the thickness of softwood to hardwood and the overall thickness of the bonded wood layers. Nothing in the above specification is intended to limit the invention more narrowly than the appended claims. The examples given are intended only to be illustrative rather than exclusive.

What is claimed is:

1. A ceiling/floor structure, comprising:
a single set of adjacent boards, wherein each of said adjacent boards includes a two species bonded board having a softwood side and a hardwood side, wherein each of said adjacent boards is formed from a single piece of saw cut hardwood directly bonded to a single piece of saw cut softwood, wherein each of said adjacent boards has a first edge with a tongue and a second edge with a groove, and wherein said softwood side forms the ceiling of a first room and said hardwood side forms the floor of a second room.

2. A structure as recited in claim 1, further comprising carrying beams for supporting said single set of adjacent boards.

3. A structure as recited in claim 2, wherein said carrying beams include at least one from the group including a floor joist and a posted main carrying beam.

4. A structure as recited in claim 2, further comprising walls, wherein said carrying beams span said walls between two levels within a building.

5. A structure as recited in claim 2, wherein said softwood side faces said carrying beams.

6. A structure as recited in claim 2, wherein said set of adjacent boards are secured to said carrying beams.

7. A structure as recited in claim 1, wherein said set of adjacent boards are laid with said tongue in said groove.

8. A structure as recited in claim 1, wherein said softwood side includes a chamfer on two edges.

9. A structure as recited in claim 8, wherein said chamfer has a height of at least ⅛-inch.

10. A structure as recited in claim 1, wherein said softwood has a thickness about equal to said hardwood.

11. A structure as recited in claim 1, wherein each said adjacent board is 1-inch to 4-inches thick.

12. A structure as recited in claim 1, wherein said single layer of saw cut hardwood is greater than ⅝-inch in thickness.

13. A structure as recited in claim 1, wherein said first room includes walls and said softwood is the same species of wood as the walls of said first room.

14. A structure as recited in claim 1, wherein said single piece of saw cut hardwood is directly bonded to said single piece of saw cut softwood by an adhesive.

15. A method of fabricating a board comprising the steps of
   a) providing a saw cut hardwood layer and a saw cut softwood layer;
   b) bonding said hardwood layer to said softwood layer with an adhesive to create a two species bonded board;
   c) milling said two species bonded board to have (i) a tongue on a first edge and groove on an opposite second edge and (ii) a chamfer on said first and second edges of said softwood layer.

16. A method of fabricating a ceiling/floor comprising the steps of:
   a) providing carrying beams and a set of ceiling/floor boards, each said ceiling/floor board including a two species bonded board having a softwood side and a hardwood side;
   b) laying said set of ceiling/floor boards adjacent to each other with said softwood side towards said carrying beams; and
   c) securing each said ceiling/floor board to said carrying beams as each said ceiling/floor board is laid.

17. A method as recited in claim 16, wherein said providing step further includes each said ceiling/floor board having a first edge with a tongue and an opposite second edge with a groove.

18. A method as recited in claim 16, wherein said providing step further includes that said carrying beams span the walls between two levels within a building.

19. A method as recited in claim 16, wherein said providing step further includes that said two species bonded board is a single layer of said softwood bonded to a single layer of said hardwood.

20. A method as recited in claim 16, wherein said providing step further includes that the thickness of said softwood is about equal to the thickness of said hardwood.

21. A method as recited in claim 16, wherein said providing step further includes that said two species bonded board have a first edge and a second edge with said softwood side having a chamfer on said first and second edges.

22. A method as recited in claim 16, wherein said laying step includes laying said set of ceiling/floor boards tongue in groove adjacent to each other.

23. A ceiling/floor structure, comprising:
   carrying beams spanning between walls of a first room and a second room, a posted main carrying beam for supporting said carrying beams, and a single layer of adjacent boards; wherein each of said adjacent boards is formed from a single piece of saw cut hardwood directly bonded to a single piece of saw cut softwood; wherein each of said adjacent boards has a first edge with a tongue and a second edge with a groove, wherein said adjacent boards are laid with said tongue in said groove; and wherein said adjacent boards are secured with said softwood against said carrying beams so that said softwood forms the ceiling of said first room and said hardwood forms the floor of said second room.

24. A structure as recited in claim 23, wherein said single layer of saw cut hardwood is greater than ¼-inch thick.

25. A structure as recited in claim 23, wherein said softwood is the same species of wood as the walls of said first room.

26. A structure as recited in claim 23, wherein said softwood includes a chamfer on two edges.

27. A structure as recited in claim 26, wherein said chamfer has a height of at least ⅛-inch.

28. A structure as recited in claim 23, wherein said softwood has a thickness about equal to said hardwood.

29. A structure as recited in claim 23, wherein each said adjacent board is 1-inch to 4-inches thick.

\* \* \* \* \*